March 9, 1971  J. K. HALE ET AL  3,568,423
DUAL HITCH FRAME
Filed Oct. 17, 1967  3 Sheets-Sheet 1
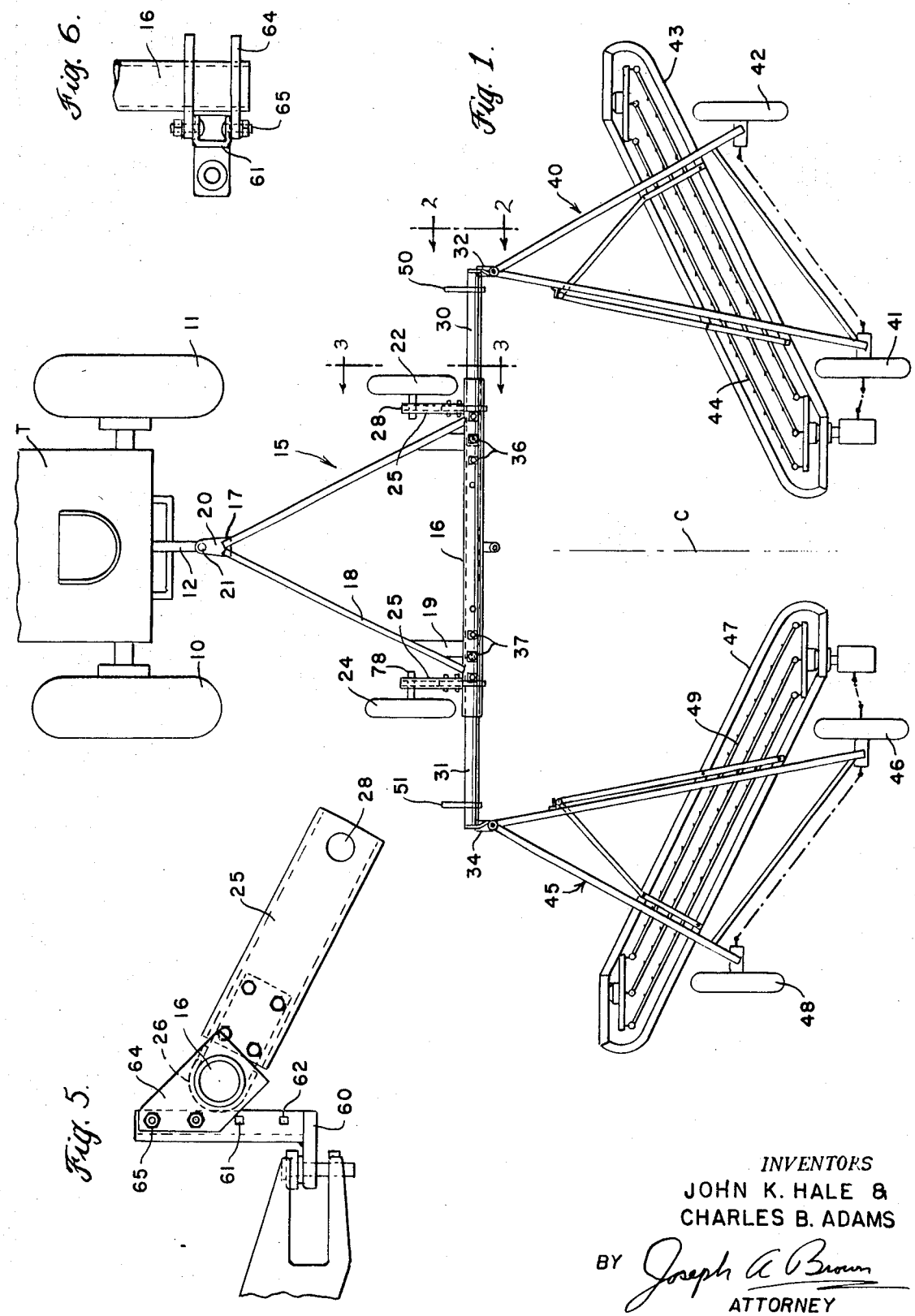
INVENTORS
JOHN K. HALE &
CHARLES B. ADAMS
BY Joseph A. Brown
ATTORNEY

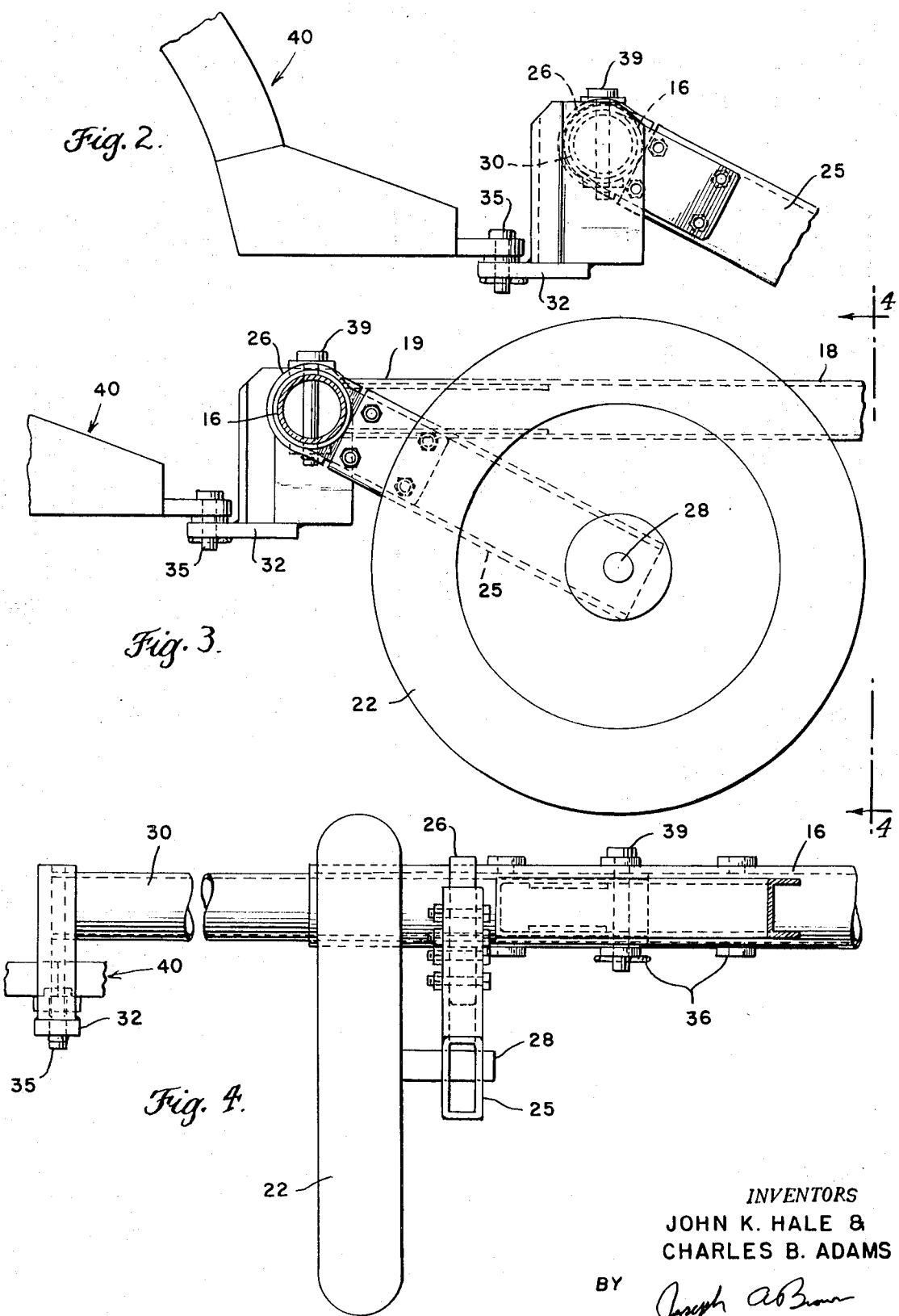

United States Patent Office 3,568,423
Patented Mar. 9, 1971

1

3,568,423
DUAL HITCH FRAME
John K. Hale and Charles B. Adams, New Holland, Pa., assignors to Sperry Rand Corporation, New Holland, Pa.
Filed Oct. 17, 1967, Ser. No. 678,772
Int. Cl. A01d 77/06
U.S. Cl. 56—377      2 Claims

ABSTRACT OF THE DISCLOSURE

A dual hitch frame connectable to a tractor to be towed thereby over a field having hay to be raked and adapted to have connected to it a pair of side delivery rakes which deliver raked hay toward each other for deposit in a single windrow, said hitch frame comprising a horizontal transverse bar perpendicular to the direction of travel having a pair of laterally spaced hitch members to which the rakes are attached and having a pair of ground wheels.

BACKGROUND OF THE INVENTION

In the west and southwestern parts of the United States, windrowers are commonly employed which cut a wide swath of material, such as fourteen feet wide. Such machines are also commonly found in Western Canada and other areas. In a windrower, the material is consolidated toward the center of the machine and deposited on the ground. In a fourteen foot machine, the center of the deposited windrow is seven feet from the edge of tne cut swath. When this hay is baled, it is common to use a large heavy duty baler which handles substantial tonnages per hour. Particularly in custom baling operations, the baler operators like to have big windrows so that the balers can be operated at peak capacity. Therefore, the operators frequently like to rake two large windrows together to form a single windrow. To achieve this, it is conventional that a single rake be used to first move one windrow to the left seven feet and then the adjacent windrow to the right seven feet to provide a combined windrow. A left handed roller bar reel rake is generally employed which goes down one windrow and then turns around to come back the other windrow.

Of the trail-type side delivery roller bar hay rakes presently being sold, it is believed that substantially all of them are left hand rakes, that is, they deliver material to the left end of the rake facing in the direction of travel. A right hand rake has been developed which is identical to the left hand rake except that it will deliver material oppositely to the present conventional left hand rake. To use this right hand rake, the dual hitch frame of this invention has been developed. Such frame is connectable to a tractor and will simultaneously tow a left and a right hand side delivery rake in lateral register with each other, the rake to the right discharging material to the left and the rake to the left discharging material to the right.

SUMMARY OF THE INVENTION

An important object of this invention is to so locate and operate such rakes relative to each other that they may be operated at faster ground speeds than is conventional with rakes of this type and without scattering of the hay along the ground.

2

Another object of this invention is to provide a dual hitch frame whereby two side delivery hay rakes may be simultaneously operated to deliver hay toward each other, one delivering hay to the left and the other delivering hay to the right, and means being provided to vary the spacing between the rakes to accommodate raking conditions and the size of the hay windrow to be combined.

Another object of this invention is to provide a dual hitch frame of the character described wherein the ground wheels are so located relative to the hitch frame that they prevent the drawbar of the tractor from being overloaded.

A further object of this invention is to provide a dual hitch frame in which a pair of ground wheels are selectively attachable to a hitch bar in one of two positions, and when in a first location operate alongside a windrow to be raked and when in a second location operate to travel on top of the windrowed hay to be raked.

A still further object of this invention is to provide a hitch frame having a hitch bar which is vertically adjustable to accommodate various heights of windrows to be raked.

A still further object of this invention is to provide a dual hitch frame of the character described which is relatively simply constructed whereby it may be manufactured and sold at low cost.

Other objects of this invention will be apparent hereinafter from the specification and from the recital in the appended claims.

BRIEF DESCRIPTION OF THE DRAWINGS

In the drawings:

FIG. 1 is a plan view showing diagrammatically a tractor, a left hand side delivery hay rake, a right hand side delivery hay rake, and a hitch frame constructed according to this invention whereby such rakes may be simultaneously operated;

FIG. 2 is an enlarged fragmentary end view taken generally on the line 2—2 of FIG. 1 looking in the direction of the arrows;

FIG. 3 is an enlarged section taken on the line 3—3 of FIG. 1 looking in the direction of the arrows and showing in particular the mounting of one of the ground wheels relative to the hitch bar;

FIG. 4 is an end view taken on the line 4—4 of FIG. 3 looking in the direction of the arrows;

FIG. 5 is a view similar to FIG. 3 showing a modified form of wheel support whereby the hitch bar may be vertically adjusted relative to the ground;

FIG. 6 is a fragmentary plan view of FIG. 5; and

DESCRIPTION OF THE PREFERRED EMBODIMENT

Figure 7:
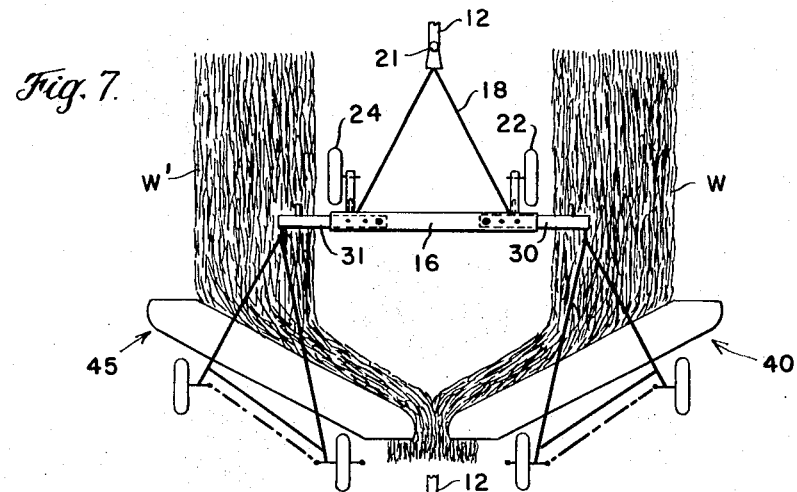
FIGS. 7, 8 and 9 are diagrammatic plan views of the hitch frame of this invention and showing various operational positions thereof.

Referring now to the drawing by numerals of reference, and particularly to FIG. 1, T denotes a tractor having ground wheels 10 and 11 and a central drawbar 12. The tractor is adapted to travel forwardly and the longitudinal center line of the direction of travel is indicated by the dot-dash line C.

Connected to drawbar 12 and in trailing relation to tractor T is a dual hitch frame 15 constructed according to this invention and having a horizontal hitch bar 16 which extends perpendicular to the line of travel C. The hitch bar is rigid with a frame stucture 18 which is generally V-shaped with the apex 17 of the V forwardly. The rearward ends 19 of frame 18 are connected to bar 16 and there is a clevis 20 at apex 17 connected to tractor drawbar 12 by a hitch pin 21.

Hitch frame 15 is supported on ground wheels 22 and 24. Each wheel is carried on a support arm 25 which extends downwardly and forwardly of hitch bar 16 and at its upper rearward end, arm 25 had a strap 26 connected to it which encircles the hitch bar. At its lower forward end, each arm 25 has an outwardly projecting spindle 28 for its associated wheel; and as shown in FIG. 1, each hitch frame wheel is laterally outwardly of the arm on which it carried. Also, the wheels 22 and 24 are both in front of the hitch bar 16.

Hitch bar 16 is tubular in cross section and it is opened at its ends. Telescoped into the ends are pipe sections 30 and 31 which carry hitches 32 and 34 respectively. The hitches project rearwardly of the pipes and each is provided with a vertical opening 35. Hitch bar 16 has two sets of vertical holes 36 and 37 and each pipe 30–31 has a hole 38 in its inner end adapted to receive a pin 39. With this structure the amount of projection of each pipe 30–31 from hitch bar 16 can be varied as desired.

The right hand hitch 32 has connected to it a side delivery hay rake 40 of the roller bar reel type and constructed for example as shown in Pat. No. 2,929,192. The rake has ground wheels 41 and 42 and a rake basket 43 and reel 44 of conventional construction. Hay engaged by rake 40 is raked laterally toward the left and simultaneously diagonally rearwardly toward the center line C of the tractor. Connected to the other hitch 34 is a rake 45 having ground wheels 46 and 48, a rake basket 47 and a raking reel 49. Rake 45 is identical in construction to the rake 40 except that it is a right hand rake instead of a left hand rake, that is, hay engaged by rake 45 is raked toward the right and diagonally rearwardly toward the center line C.

As will be noted from FIG. 1, hitch frame 15 and rakes 40–45 provide a symmetrical arrangement. The spacing of rake 40 to the right of the centerline C is the same as the spacing of the rake 45 to the left of the line. Both rakes are of the same size and weight. Draft forces on one side of the hitch frame are offset by similar draft forces on the opposite side.

One other structural feature to be noted is that when the dual hitch frame is operated in the field, the rakes ordinarily operate as shown in FIG. 7, to move previously windrowed crop material. The right hand rake 40 delivers one windrow W laterally to the left and the left hand rake 45 delivers a windrow W' laterally toward the right. It will be noted that the hitch frame ground wheels 22 and 24 operate laterally inwardly of the respective windrows W–W' to be raked.

The two identical but opposite side delivery rakes being located in side by side register, may be operated at very high speed. The material discharging from rake 40 is directed diagonally into the material coming from rake 45. The lateral force upon the hay exerted by each rake which might ordinarily tend to spread the hay along the ground is opposed by the two portions of hay coming together on the center line C. The tendency of windrow W to be cast to the left is stopped by the hay coming from the right from windrow W' and vice versa. Therefore, the ground speed of the raking operation may be much faster than when either rake is used alone.

Figure 8:
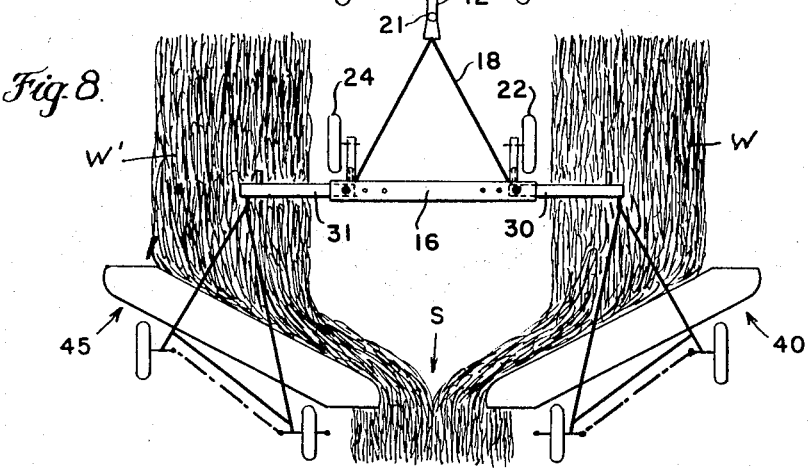

Referring to FIG. 8, when the windows W and W' are bigger than usual, the extension pipe sections 30 and 31 may be moved outwardly so that the rakes will more properly engage the hay. Further, since more hay is being raked, the spaces between the two rakes on the center line C is greater than when the rakes are in their normal position. This can be seen from a comparison of FIGS. 7 and 8.

Figure 9:
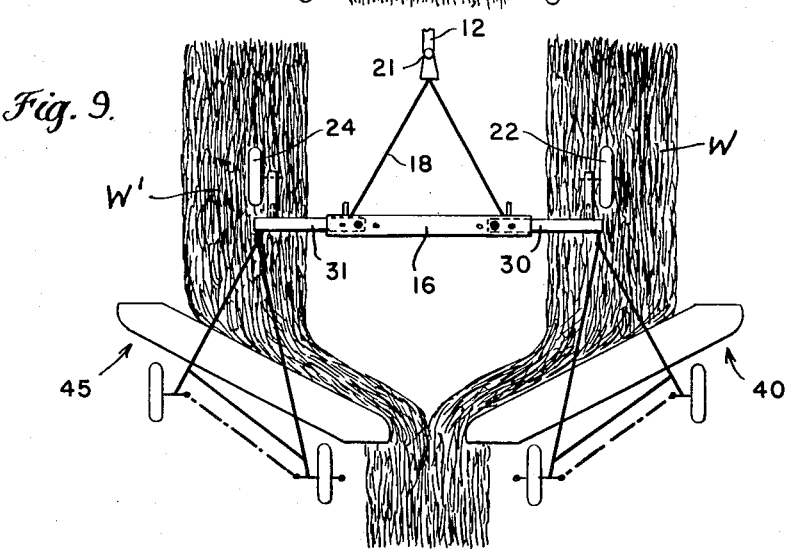

When the hay in the windrow is piled highly, and might catch upon the rake bar 16, the operator may attach the wheels 22 and 24 to terminal ends of the extensions 30 and 31 whereupon the wheels will travel on top of the windrow in front of the following rakes. Pipe 30 has an outer attachment strap 50 for wheel 22 and pipe 31 has an outer attachment strap 51 for wheel 24. When the wheels are in these positions, FIG. 9, wheel 22 rolls on top of windrow W and wheel 24 rolls on top of windrow W'. In this way, the hay is pushed down so that it will freely pass beneath the hitch bar 16 and will then be raked by the side delivery rakes and into a single large windrow.

Another approach to the situation when the windrows are of greater than usual height is to leave the wheels inwardly of the windrow as shown in FIG. 7 but to adjust the hitch bar 16 vertically so that it will be sure to clear the hay to be raked. This is achieved by the modified structure shown in FIGS. 5 and 6, wherein there are no insert pipes 30 and 31. Hitch bar 16 extends from one end of the hitch frame to the other. At each lateral end, bar 16 has a hitch plate 60. Also there is a vertical bracket 61 formed with a series of holes 62. There is a bracket 64 through which bar 16 extends and the bar is bolted to wheel arm 25. Bracket 64 is adapted to be connected to bracket 61 in a desired location depending upon the holes through which the bolts 65 will be projected. In this way, hitch members can be raised or lowered relative to the ground to accommodate the hitch member to the heights of the windrows.

Having thus described our invention, what we claim is:

1. A dual hitch frame for interconnecting two oppositely raking side delivery rakes to a tractor provided with a conventional drawbar, each of the side delivery rakes having a diagonally extending raking means and a forwardly extending hitch disposed between the ends of the raking means, said dual hitch frame comprising:

a generally triangularly shaped frame means having a rigid horizontal bar transverse to the line of travel and with two opposite end portions equally spaced from the line of travel on opposite sides thereof and having forwardly converging members non-rotatably secured to said bar at equal distances from and on opposite sides of the line of travel and with attaching means at the forward converged end in the line of travel for detachably connecting said frame means to a drawing tractor;

two support members rigidly secured to opposite end portions of said bar outwardly of said forwardly converging members, said support members extending forwardly and downwardly in fixed relation to said bar;

two ground wheels rotatably mounted on said support members with the axes of rotation thereof forward of said bar;

two laterally spaced hitch members, and means for telescopically mounting said hitch members on said end portions for lateral adjustment of said hitch members, the outer ends of each of the hitch members being provided with means to which the forwardly extending hitch of a side delivery rake may be secured;

the dual hitch frame being so arranged and constructed that when the dual hitch frame is secured to a tractor and the oppositely raking side delivery rakes to the dual hitch frame the rakes will extend outwardly beyond the respective sides of the dual hitch frame and diagonally rearwardly to deliver two spaced windrows towards one another into a single windrow.

2. A dual hitch frame as recited in claim 1 wherein said means for mounting said hitch members on said end portions, respectively, is vertically adjustable for setting said hitch members at various positions relative to said bar and heights relative to the ground.

References Cited

UNITED STATES PATENTS

| | | | |
|---|---|---|---|
| 2,178,467 | 10/1939 | Brent | 280—412 |
| 2,545,723 | 3/1951 | Conner | 56—376 |
| 2,602,280 | 7/1952 | Crowe et al. | 56—377 |
| 2,603,053 | 7/1952 | Lipe et al. | 56—377X |
| 2,618,111 | 11/1952 | Egstad | 56—376X |
| 2,635,411 | 4/1953 | Hicks | 56—377 |
| 2,658,770 | 11/1953 | Koenig | 280—467X |
| 2,988,864 | 6/1961 | Van Der Lely et al. | 56—377 |
| 3,043,604 | 7/1962 | Rehnberg et al. | 280—43 |
| 3,077,722 | 2/1963 | Sadler et al. | 56—377 |
| 3,145,522 | 8/1964 | Zink | 56—377 |

LOUIS G. MANCENE, Primary Examiner

J. A. OLIFF, Assistant Examiner

U.S. Cl. X.R.

280—456